United States Patent [19]

Wajs et al.

[11] 4,062,627
[45] * Dec. 13, 1977

[54] FLEXIBLE CONTACT LENS

[75] Inventors: Georges Wajs, Ivry; William Lenne, Gagny, both of France

[73] Assignee: Essilor International (Compagnie Generale d'Optique S.A.), Joinville-le-Pont, France

[*] Notice: The portion of the term of this patent subsequent to May 25, 1993, has been disclaimed.

[21] Appl. No.: 633,031

[22] Filed: Nov. 18, 1975

Related U.S. Application Data

[63] Continuation of Ser. No. 417,250, Nov. 19, 1973, abandoned.

[30] Foreign Application Priority Data

Aug. 6, 1973 France .................................. 73.28665

[51] Int. Cl.² ............................................. G02C 7/04
[52] U.S. Cl. .................................... 351/160; 351/177
[58] Field of Search ............................... 351/160, 177; 204/159.13; 260/827; 427/35, 36

[56] References Cited

U.S. PATENT DOCUMENTS

| | | | |
|---|---|---|---|
| 3,228,741 | 1/1966 | Becker | 351/160 |
| 3,700,573 | 10/1972 | Laizier et al. | 351/160 X |
| 3,750,272 | 8/1973 | Gomond | 351/160 X |
| 3,761,208 | 9/1973 | Boudet et al. | 351/160 X |
| 3,808,113 | 4/1974 | Okamura et al. | 351/160 X |
| 3,916,033 | 10/1975 | Merrill | 351/160 X |
| 3,925,178 | 12/1975 | Gesser et al. | 351/160 X |

Primary Examiner—David H. Rubin
Attorney, Agent, or Firm—Henry R. Lerner

[57] ABSTRACT

An improved flexible contact lens is provided having hydrophilic and lipophobic properties which allow extended duration of wear by eliminating or greatly reducing the risk of rupture of the natural tear film produced by the cornea. These properties are achieved by crosslinking a selected water soluble polymer which has been grafted onto a pre-formed substrate, for example crosslinking polyvinyl pyrrolidone which has been previously grafted onto a silicone substrate. The grafting and the crosslinking are accomplished in separate stages.

2 Claims, 1 Drawing Figure

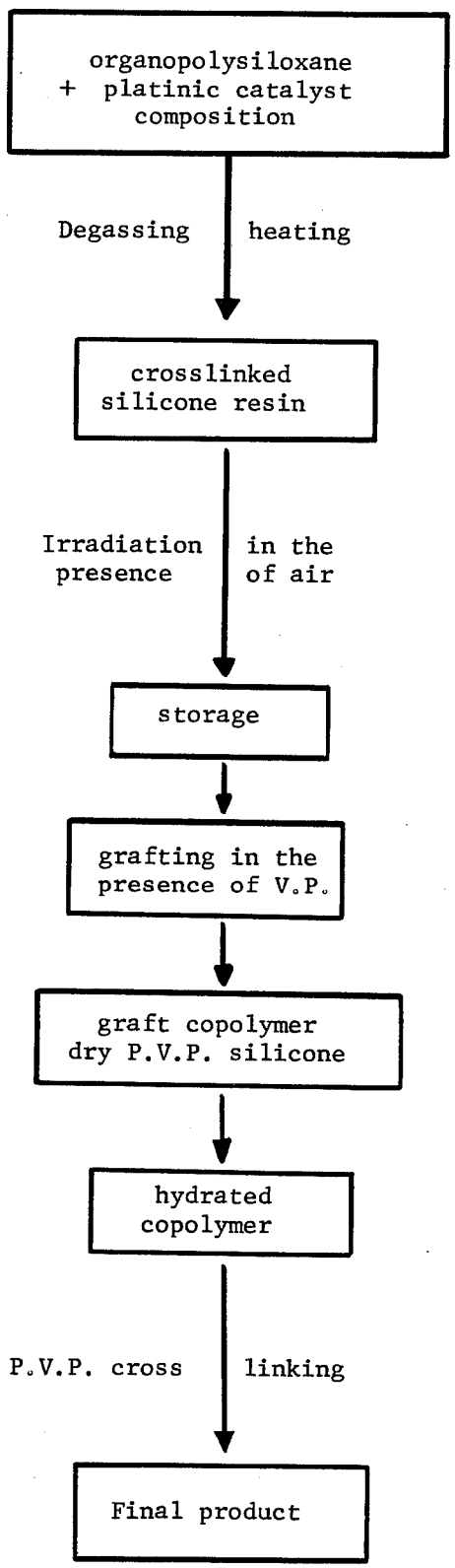

FLEXIBLE CONTACT LENS

This is a continuation of application Ser. No. 417,250, filed Nov. 19, 1973, now abandoned.

BACKGROUND OF THE INVENTION

Flexible contact lenses are well known to the art. There are a number of basic types of these lenses. One of the oldest of these is made from a base material of crosslinked hydroxyethylmethacrylate. This material achieves its flexibility by inflation or absorption of a substantial amount of water, frequency 35 to 75% by weight of the base material. Because of their structure the above acrylate materials are frequently sensitive to the pH of the lachrymal fluid, can tear easily and due to their requisite highly hydrophilic structure are subject to biological contamination which is then difficult to eliminate. A second type of lens made of a specified silicone polymer has been described in U.S. Pat. No. 3,228,741. Silicone polymers of this type are primarily lipophilic and have well known hydrophobic characteristics. In addition, they generally require an incorporated inorganic filler, such as silica, to provide enough material strength to make their use practical. Because of the use of a filler it is difficult to obtain a proper index of refraction in the material to facilitate fabrication of lenses suitable for correction of astigmatism. The lack of hydrophilicity and consequent non-wettability of the surface of silicone lenses leads to rupture of the tear of lachrymal fluid film. Such film tearing results in irritation and reduction in the amount of time the lens can be safely and comfortably worn. The problem of surface wettability of silicone type lenses has been considered in U.S. Pat. No. 3,700,573 assigned to the assignee hereof. The approach taken in this patent was an attempt to render the silicone polymer hydrophilic by grafting it with polyvinylpyrrolidone. While this graft method has merit, it has not been completely satisfactory because of the enormous individual variation of the lacrymal film. The cornea is a living tissue and as such must be protected from abrasion to avoid irritation and possible permanent damage. The cornea normally produces a fluid which covers it and thus reduces any abrasion between it and objects, such as a contact lens, placed upon it. This fluid layer can be considered as a pre-corneal film and therefore in addition to its anti-abrasion function, it must be kept in a continuous non-ruptured state for proper distortionless vision. This fluid layer or lachrymal film performs numerous other functions in relation to the cornea such as waste disposal, oxygen transport, electrolyte balance and the like. This functional multiplicity results in the film being entirely dependent on the individual. The percentage composition of aqueous and lipidic components in the film thus also varies with the individual.

It is thus understood that a contact lens having hydrophilic and lipophobic properties, to prevent tear film rupture in the greatest proportion of individuals is extremely desirable. Provision of such a lens would increase the amount of time the lens could be worn, reduce eye irritation and provide better vision because of elimination or substantial reduction of any distortion caused by rupture of the film.

SUMMARY OF THE INVENTION

It is an object of this invention to provide a flexible contact lens having hydrophilic and lipophobic characteristics.

A second object is to provide a contact lens which will eliminate or substantially reduce the risk of rupture of the lachrymal film thus substantially insuring the permanence and continuity of the pre-corneal lachrymal film.

A further object is to provide a method of altering the wetting characteristics of a contact lens to suit the individual.

Another object is to produce a contact lens having comfortable wear characteristics and the ability to be worn for long periods of time without irritation. Yet another object is to provide a lens having an index of refraction which is particularly adaptable to the correction of astigmatism.

Other objects and many of the attendant advantages of this invention will appear as the description proceeds.

The attainment of the above objects is made possible by this invention which includes a contact lens of generally concavo-convex shape, adapted to be worn on the cornea comprising a molded, crosslinked, graft copolymer of silicone and polyvinyl pyrrolidone.

The distinction between the wettability characteristics of the present invention wherein the graft polymer is cross-linked and the contact lenses of the art can be summarized as follows:

1. Raw silicone is very lipophilic and has essentially hydrophobic characteristics.

2. Silicone — polyvinyl pyrrolidone graft copolymer has good hydrophilic characteristics and limited lipophilic characteristics. The increase in hydrophilicity is due to the water absorptive nature of the polyvinyl pyrrolidone graft. Frequently, what little lipophilic characteristics this graft has are transitory.

3. Crosslinked, silicone — polyvinyl pyrrolidone graft has hydrophilic and lipophobic characteristics. The crosslinking of the grafted polyvinyl pyrrolidone while slightly reducing its hydrophilicity does not affect the wettability but substantially increases its lipophobicity. The resulting characteristics, of course, depend on the degree of cross-linking.

The shaping of the lens of this invention is accomplished by molding in a set of dies. The procedure for this is disclosed in U.S. application Ser. No. 189,644 to Jean Boudet et al, filed Aug. 15, 1971, assigned to the assignee hereof.

The lens of the instant invention has a generally concavo-convex shape, and is adapted to float on and adhere to the cornea, over the pre-corneal film described herein.

BRIEF DESCRIPTION OF THE DRAWING

The FIGURE shows a flow diagram of the general preparative steps to form the final product of this invention.

DESCRIPTION OF THE INVENTION

Broadly, in the practice of this invention, a molded silicone substrate is irradiated and subjected to grafting with N — vinyl pyrrolidone monomer, to form a graft copolymer, the graft copolymer is then irradiated to crosslink the grafted material. This crosslinked material then has the desirable wettability characteristics of this invention. For example, one method of preparing the finished lens generally involves preparing a mixture of the silicone prepolymer, degassing the mixture to remove entrained gas, introducing the degassed prepolymer into a mold, polymerizing or curing the prepolymer to form the molded substrate, irradiating the substrate in the presence of an oxidizing medium, contacting the irradiated substrate with a grafting medium containing N — vinyl pyrrolidone monomer to form the graft copolymer and irradiating the graft copolymer to crosslink the grafted copolymer. This second stage irradiation, promoting crosslinking of the grafted N — vinyl pyrrolidone units produces a molded lens having the hydrophilic and lipophobic properties as previously described. Before use, the lens thus formed, is immersed in a solution approximating lachrymal fluid such as physiological serum.

In general, the silicone substrates are obtained by crosslinking, with platinum containing catalysts, adequate organopolysiloxane compositions which are substituted by a major amount of hydrocarbonate groups having no aliphatic unsaturation and by a minor portion of groups with an aliphatic unsaturation in addition some of these organopolysiloxanes contain hydrogen atoms linked to the silica atoms.

These compositions may for instance contain:

1. 100 parts of a diorganopolysiloxane of general formula $$\begin{array}{ccc} R & R' & R \\ | & | & | \\ CH_2=CHSiO & (SiO)_n & SiCH=CH_2 \\ | & | & | \\ R & R' & R \end{array}$$

in which the symbols R and R', similar or different, represent alkyl groups having 1 to 4 carbon atoms such as methyl, ethyl, propyl, butyl, aryl groups having 6 to 8 carbon atoms such as phenyl, tolyl, xylyl, at least 50% of the R' symbol represent methyl groups, the symbol n represents any number having a value such that the diorganopolysiloxane viscosity ranges from 300 cPo at 25° C to 800 000 cPo at 25° C, preferably from 500 cPo at 25° C to 200 000 cPo at 25° C.

2. 5 to 50 parts of a copolymer constituted of units of formulae

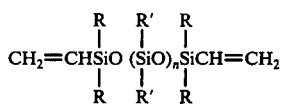

in which the symbols R", similar or different, represent alkyl groups having 1 to 3 carbon atoms such as methyl, ethyl, propyl, the symbol a represents 1 or 2 and the ratio of the number of $(R'')_3SiO_{0.5}$ and

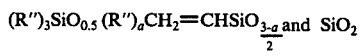

units to the number of $SiO_2$ units ranges from 0.5/1 to 1.2/1, said copolymer contains from to 1.5 to 3.5% by weight of vinyl groups.

3. An hydrogenorganopolysiloxane of average general formula

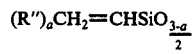

in an amount sufficient to provide from 0.8 to 1.9 SiH bond for 1 SiCH = $CH_2$ bond of polymers 1 ) and 2), in this formula symbol R' has the above mentioned meaning, symbol b represents any number from 0.8 to 2, symbol c represents any number from 0.3 to 1, 1 mol of the hydrogenopolysiloxane containing at least 2 SiH bonds.

4. A platinum containing catalyst. Details on the preparation of such compositions appear more precisely in U.S. Pat. Nos. 3,436,366 and 3,284,406. As an illustration of compositions particularly suitable for the preparation of the contact lenses of the invention can be cited those containing:

100 parts of a diorganopolysiloxane oil of formula

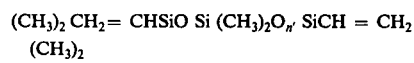

in which symbol n' has a value such that the oil viscosity ranges from 500 to 5 000 centipoises at 25% C.

25 to 40 parts of a copolymer constituted by units of formulae $(CH_3)_3SiO_{0.5}$, $(CH_3) CH_2 = CHSiO$ and $SiO_2$ the ratio of the number of $(CH_3)_3SiO_{0.5}$ and $(H_3)CH_2=$ CHSiO units to the number of $SiO_2$ units ranging from 0.6/1 to 1/1.

An hydrogenomethylpolysiloxane of average formula

in an amount sufficient to have 0.9 to 1.7 SiH bond for one SiCH = $CH_2$ bond of the 2 above mentioned polymers, in this formula symbol b' represents any number from 0.9 to 1.6 and symbol c' any number from 0.45 to 0.85

0.0009 to 0.005 parts of platinum in a soluble form in a solvent such as an alkanol having from 1 to 15 carbon atoms.

The mixtures are advantageously placed under a pressure lower than the atmospheric pressure at a temperature between 15° C and 60° C in order to eliminate the gases and the products of low molecular weight which they contain. They are subsequently placed in appropriate molds and the assembly is heated to approximately 80°– 160° C during 1 to 5 hours. During this heating period, the mixtures are cured to silicone elastomers.

The substrate is removed from the mold and irradiated with ionizing radiation. The type of ionizing irradiation is not critical, the only requirement being that the silicone substrate must not be degraded to the point where optical properties are deleteriously affected. Gamma rays from $^{60}CO$ may be used as well as x-rays and U.V. irradiation or irradiation from electron bombardment, so long as the radiation is of a type which will cause ionization of portions of the substrate. This irradiation takes place in the presence of an oxidizing medium such as pure oxygen, air or an oxidizing solution, preferably in the presence of atmospheric oxygen. The radiation dosage is preferably from about 0.1 to 20 m rads. The total dosage may be achieved by varying the time and intensity of exposure, subject of course to the retention of optical properties in the substrate. Lenses so irradiated ready for grafting can be conserved in this irradiated state at 0° C for long periods of time.

Dissolved oxygen is then removed from the irradiated substrate and from the grafting medium, for example, according to the procedure described in the U.S. Pat. No. 3,700,573 previously cited. The substrate is then contacted with the grafting medium having a major proportion of N-Vinyl pyrrolidone monomer, either pure monomer or a solution thereof. The substrate may be heated before such contact if desired up to about 250° C, however the grafting reaction will proceed at ambient temperatures. If the temperature is to be elevated it is preferably raised to about 120° to 200° C. Under these conditions the grafting reaction is initiated. The contact time between the substrate and the monomer may be varied from about 15 minutes to 2 hours. The grafted substrate is then washed and oven dried. The essential component of the grafting medium is N-Vinyl pyrrolidone monomer, however it is found that a small proportion of polyvinylpyrrolidone up to about 5% by weight and/or a small amount, preferably when used, up to about 5% by weight of an alkylsilicone/-polyoxyalkylene block copolymer surfactant chosen from the copolymers described in pages 373 to 376 of W. Noll's "Chemistry and Technology of silicones" may advantageously be added. As an indication the branched or linear copolymers of the following formula would be suitable:

$(CH_3)_3Si[OSi(CH_3)_2]$

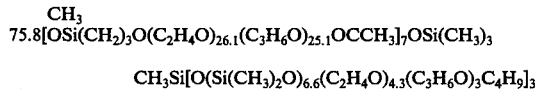

$CH_3Si[O(Si(CH_3)_2O)_{6.6}(C_2H_4O)_{4.3}(C_3H_6O)_3C_4H_9]_3$

The small amounts of polymerized polyvinylpyrrolidone and/or surfactant, when used, prevent craters and other geometric deformations and also facilitate wetting of the substrate, pre-irradiated silicone, by the grafting medium. The use of these additives, while not essential, is preferred.

The N-Vinylpyrrolidone monomer and polyvinylpyrrolidone obtained therefrom employed in this invention are prepared by conventional methods well known to the art. The N-Vinylpyrrolidone monomer is distilled, for example, through a Vigreux column, to insure purity and then collected. The polyvinylpyrrolidone, when used as an additive is an unfractionated product obtained by polymerisation of the above monomer in 40% aqueous solution. The K value of the polymer is 30. The molecular weight about 40,000. A particularly convenient polymer is one sold under the name PLASDONE, a registered trademark of G A F. The monomer is used in the grafting medium either in the pure undiluted state or in aqueous solutions ranging from about 50% by weight monomer up until pure monomer is attained. The grafted substrate, depending on process variables of temperature, time, irradiation and concentration of grafting medium, may vary from a homogeneous graft copolymer to a surface graft. For example, a high radiation dose from about 0.1 m rads to 20 m rads and then grafting in pure monomer, with or without the previously described additives, for about 0.1 to 8 hours at a temperature of about 120° to 200° C produces a homogeneous copolymer throughout the substrate. The rate of grafting can be determined by a simple weighing.

The preferred composition is about 75–99% silicone polymer and about 1–25% polyvinyl pyrrolidone graft.

Irradiation of the substrate in the presence of an oxidizing medium is thought to promote peroxide site formation, in the silicone substrate, these sites when contacted with the N-Vinylpyrrolidone monomer react to form the graft copolymer. The N-Vinylpyrrolidone monomer, because of the vinyl groups, reacts principally with the peroxide sites on the silicone. If there is any reaction of the monomer with itself only linear or branched polymers will be produced, but not crosslinked polymers.

The crosslinking step is performed on the grafted substrate. A crosslinking agent may be used, as for example 1 to 5 percent of hydroxyethylmethacrylate or diethylene glycol dimethacrylate. But these agents are not as satisfactory as the use of a second irradiation step. The second irradiation may use the same radiation source previously described subject to the same limitations except this irradiation step takes place advantageously in an inert atmosphere. For example an ultraviolet light generator producing an intensity of 30 000 W/cm$^2$ and having a wave-length of 2,537 Angstrom units is suitable as well as other radiation sources. If the above generator is used an irradiation time of from about 4 to 16 hours is found suitable to produce the desired crosslinking. It is to be noted that an essential feature of this invention is the graft copolymer crosslinking step and the crosslinked graft copolymer thus produced. A number of radiation sources as previously described employing different intensities for different periods of time are used to produce products having varied lipophobic characteristics. The total radiation dose is determinative of the extent of crosslinking: as above mentioned, this dose is preferably from 0.1 to 20 m rads. This crosslinking is thought to take place principally between the polyvinyl pyrrolidone chains grafted onto the silicone. As crosslinking is increased the normally highly hydrophilic graft copolymer loses slightly its hydrophilicity and becomes more lipophobic, thus varying these properties in the pre-formed structure.

As to the index of refraction of the crosslinked graft copolymer, it varies with the molecular proportion of both silicone and polyvinylpyrrolidone present in the copolymer.

Generally, the silicone has a refractive index of 1.42, the polyvinylpyrrolidone has an index of 1.51. The final lens has an index which depends on the proportions of each. Usually, in use the lens is allowed to equilibrate in a solution approximating tear fluid thus absorbing some water. The refractive index of the water is 1.33 and contributes proportionately to the total refractive index of the lens. By proper design the lens can be prepared to have a refractive index of about 1.39 to 1.45. The lower of these indices, is particularly advantageous in obtaining lenses which will correct astigmatism. A silicone lens filled with silica, for example, has a higher refractive index and is thus not as effective for correction of astigmatism. The dry grafted copolymers are more or less cloudy. The transparency can be restored by immersion in water. An important property of a contact lens is permeability to oxygen and carbon dioxide, both of which gases must have good access and egress to and from the cornea. It is found that the novel crosslinked grafted polymer of this invention retains a substantial part of the excellent permeability usually present in silicones. This permeability is the gas transmission expressed in terms of cubic centimeters of gas transmitted through 100 square inches of a 1 mil thick film of the material with one atmosphere of pressure differential across the film, measured at 77° F for 24 hours. This permeability may be reported as a permselectivity coefficient which is the gas transmission of carbon dioxide divided by that of oxygen. Representative permeabilities are reported in Table I.

Table I

| Comparative Permeabilities and Permselectivity | | | |
|---|---|---|---|
| | Permeabilities | | Permselec- |
| | $O_2$ | $CO_2$ | tivity |
| RTV Silicone alone | 157 000 | 650 000 | 4.5 |
| Dry copolymer at 10% | 90 000 | 417 000 | 4.6 |
| Hydrated copolymer at 10% | 46 700 | 317 000 | 6.8 |
| Dry copolymer at 16% | 89 500 | 400 000 | 4.5 |
| Hydrated copolymer at 16% | 60 000 | 392 000 | 6.5 |

This permselectivity which facilitates the gas transmission on the cornea and, particularly, ensures its good oxygenation, varies relatively little for the rates of grafting used and is important for the values of about 10 which are generally preferred in the embodiments of the invention.

The following examples will more fully illustrate the embodiments of this invention. All parts and proportions referred to herein and in the appended claims are by weight unless otherwise indicated. EXAMPLE 1

An organopolysiloxanic composition containing the following components is used:

78 g of a dimethylpolysiloxanic oil blocked at each end by an unit of formula $(CH_3)_2 CH_2 = ChSiO_{0.5}$, of viscosity 1 000 cPo at 25° C.

25 g of a copolymer constituted of units of formula $(CH_3)_3 SiO_{0.5}$, $(CH_3) CH_2 = CHSiO$ and $SiO_2$, respectively distributed in the numerical ratio 2.3/0.4/3.5.

5.5 of a copolymer constituted of units of formula $(CH_3)_2 HSiO_{0.5}$ and $SiO_2$, respectively distributed in the numerical ratio 2/1.

0.001 g of platinum in soluble form of octylic alcohol. A mold of generally concavo-convex shape having a cavity conforming generally to the shape of the cornea is then filled with the degassed composition, pressure is applied and the temperature is raised to 120° C for 3 hours to cure the silicone. The silicone substrate weighing 36 mg. is then removed and subjected, in the presence of air, to 3 m rads radiation at an intensity of 0.2 m rads/hour. The oxygen is then removed from the irradiated substrate by bubbling of nitrogen through the grafting monomer, consisting of N-Vinyl pyrrolidone and 5% of PLASDONE K. The temperature of the system is raised to 130° C for 15 minutes. The graft copolymer substrate is removed and found after washing and drying to weigh 39.2 mg thus gaining 3.2 mg of polyvinylpyrrolidone. The grafted substrate is then swollen again in water and exposed to a U. V. generator furnishing 30 000 w/cm² at a wavelength of 2537 Angstrom units, for 2 hours, and stored wet for use.

EXAMPLE 2

The substrate is prepared in exactly the same way as in Example 1; the total silicone weight is 39.9 mg grafting is accomplished as in Example 1 and on reweighing the grafted substrate weighs 43.5 mg thus gaining 3.6 mg of polyvinylpyrrolidone. The crosslinking step is carried out exactly as in Example 1 except the duration of irradiation is 4 hours. The crosslinked graft copolymer is stored wet for use.

EXAMPLE 3

The same procedure as carried out in Example 1 is performed except the weight of the silicone substrate is 40 mg and the weight of the grafted substrate is 43.5 mg. The second irradiation is exactly the same as in Examples 1 and 2 except that the duration of irradiation is of 8 hours. The sample is then stored wet for use.

EXAMPLE 4

Same procedure as in example 1, but with 39.7 mg of silicone, a total weight after grafting of 43.3 mg and a duration of second irradiation of 16 hours.

EXAMPLE 5

Same procedure as in example 1, but with 36.9 mg of silicone, 40.1 mg of grafted substrate and with no second irradiation.

The grafted substrates are tested for water pick up. The results of these tests are reported in Table II.

Table II

| | | | | Results of Water Pick Up Tests | | | | |
|---|---|---|---|---|---|---|---|---|
| Example | Silicone Resin (mg) | PVP Mg. | Total Weight | Rate of Grafting | Water Mg. | Rate of pickup | Water PVP | Time of second irradiation |
| 1 | 36 | 3.2 | 39.2 | 8.9% | 3.3 | 8.4 % | 1.03 | 2 h |
| 2 | 39.9 | 3.6 | 43.5 | 9.05% | 3.6 | 8.3 % | 1.00 | 4 h |
| 3 | 40 | 3.5 | 43.5 | 8.75% | 3.1 | 7.15% | 0.89 | 8 h |
| 4 | 39.7 | 3.6 | 43.3 | 9.1% | 3.1 | 7.15% | 0.86 | 16 h |
| 5 | 36.9 | 3.2 | 40.1 | 8.7% | 3.4 | 8.5 % | 1.06 | 0 h |

Thus it can be seen that Example 5 without the crosslinking step is much more absorptive of water than the crosslinked samples of Example 1 through 4 inclusive. It can also be seen that from 8 hours to 16 hours of radiation there is very little variation in the water pickup/PVP weight ratio. A time of irradiation of 8 hours is thus advantageously preferred.

This invention has been described with respect to certain preferred embodiments and various modifications and variations thereof will occur in the light of this invention, to persons skilled in the art, and are to be included within the spirit and purview of this application and the scope of the appended claims.

What is claimed is:

1. A contact lens of generally concavo-convex shape adapted to be worn on the cornea, comprising a shaped crosslinked graft copolymer of silicone and polyvinylpyrrolidone having water in an amount sufficient for imparting optical transparency to the lens, said lens being characterized by having irradiation induced crosslinking of said polyvinylpyrrolidone to an extent equivalent to that produced by a radiation dosage of about 0.1 to 20 m rads, to impart substantial hydrophilic and lipophobic properties to said lens thereby substantially eliminating rupturing of a pre-corneal lachrymal film containing lipidic elements engaged by said lens, said crosslinked polyvinylpyrrolidone being formed integrally with said lens without interfering with satisfactory permeability and optical properties of the lens, said lens having a maximum water absorption of 10% by weight of said lens and a refractive index after said water absorption of about 1.39 to 1.45.

2. A contact lens as defined in claim 1 consisting essentially of 75–99% by weight silicone and 1–25% by weight polyvinylpyrrolidone.

* * * * *